United States Patent [19]

Tarpley, Jr.

[11] 4,157,242

[45] Jun. 5, 1979

[54] THIXOTROPIC GEL FUELS AND METHOD OF MAKING THE SAME

[75] Inventor: William B. Tarpley, Jr., West Chester, Pa.

[73] Assignee: Energy and Minerals Research Co., Kennett Square, Pa.

[21] Appl. No.: 857,326

[22] Filed: Dec. 5, 1977

[51] Int. Cl.² ............................ C10L 7/00; C10L 7/02
[52] U.S. Cl. .......................................... 44/7 D; 44/7 A; 44/7 B; 44/7 C; 44/7 E; 44/51; 252/316
[58] Field of Search ................ 44/7 R, 7 A, 7 B, 7 C, 44/51, 7 E; 149/21, 108.2, 118; 252/316

[56] References Cited

U.S. PATENT DOCUMENTS

| 3,313,730 | 4/1967 | Caruso | 44/7 D |
| 3,539,406 | 11/1970 | Lissant | 60/219 |
| 3,732,084 | 5/1973 | Nixon et al. | 60/215 X |
| 4,030,894 | 6/1977 | Marlin et al. | 44/51 |
| 4,045,092 | 8/1977 | Keller | 44/51 |
| 4,069,022 | 1/1978 | Metzger | 44/51 |

Primary Examiner—Leland A. Sebastian
Attorney, Agent, or Firm—Seidel, Gonda, Goldhammer & Panitch

[57] ABSTRACT

A method of making thixotropic gel fuel compositions comprises the steps of absorbing a combustion enhancing material in the pores of porous solid carboniferous particles, and mixing the solid carboniferous particles containing the combustion enhancing material with a liquid fuel and an effective amount of a gelling agent, wherein the solid carboniferous particles containing the combustion enhancing material form about 5 to about 75 volume percent of the composition; and the composition made according to the method.

26 Claims, No Drawings

THIXOTROPIC GEL FUELS AND METHOD OF MAKING THE SAME

BACKGROUND OF THE INVENTION

The present invention relates to stable thixotropic gel fuel compositions wherein a solid combustible material is suspended in a liquid fuel along with a gelling agent and, optionally, an ash modifier, and a novel method of making them. The compositions are intended to be burned as fuels in standard type residential, commercial and industrial oil burners.

Recent events have underscored the need to conserve our natural resources, and more particularly, our dwindling supply of oil. One suggested manner of dealing with the energy problem has been to use more coal and solid fuels until more oil or alternate forms of energy can be discovered and commercially developed. The use of solid fuels could also reduce our dependence on foreign oil. However, most residential, commercial and industrial fuel users do not have equipment which can presently use solid fuels. Accordingly, the equipment, generally consisting of gas or oil furnaces, must either be replaced or converted to be able to burn the solid fuel.

The present invention comprises a method of making stable thixotropic gel fuel compositions and the compositions so produced which can be burned in standard types of oil furnaces, such as that described in J. J. Demeter et al., "Combustion of Coal-Oil Slurry in a 100 HP Firetube Boiler," U.S. Energy Research and Development Administration publication #PERC/RI-77/8, May 1977, with a minimal increase in cost. The Library of Congress Congressional Research Service has reported that the cost involved in converting a gas fired furnace or an oil fired furnace to one capable of burning presently known coal/oil mixtures would be about one-fourth of the cost of replacing a gas fired furnace or oil fired furnace with a solid fuel fired furnace. It is believed that the cost of conversion would be even less with the compositions of the present invention.

The method of the present invention basically involves the absorption of combustion enhancing material in porous solid carboniferous combustible material. This component is then suspended in a liquid fuel and a gelling agent to form a stable thixotropic gel fuel composition. The amount of heat energy derived from a given volume of compositions according to the present invention having a high solids content should be significantly more than the heat derived from the same volume of liquid fuel, apparently because the generally denser, solid combustible material is able to deliver more heat than the generally less dense liquid fuel. Thus, by substituting more plentiful solid combustible material for the less plentiful liquid fuel, more heat energy can be delivered while liquid fuel resources can be conserved. In addition, the combustion enhancing material which is absorbed in the porous solid combustible material significantly contributes to the efficient and essentially complete combustion of the composition.

The solid combustible material particles incorporated in the thixotropic gel fuel composition of the present invention will remain suspended indefinitely, overcoming the stability and settling problem of prior art compositions. There is no settling or agglomeration of the solid combustible material particles. Nor is there any need to resort to the prior art technique of ultra-fine grinding of the solid combustible material which was used to produce a suspension that was stable only for about one month. Thus, the solid combustible material intended for use in the present invention need only be ground in the customary manner of grinding the material when it is intended for combustion purposes.

The thixotropic gel compositions of the present invention do not require complex suspending agents, such as coal tar or surface-active materials, which interfere with the atomization process in the furnace or burner. Rather, the present fuels are formulated of particular gelling agents to form thixotropic gels which can immediately break apart upon injection in the furnace.

In addition, the thixotropic gel fuels made from the hereinafter described particulate gelling agents are far less sensitive to temperature thinning than prior art compositions. Thixotropic gelation provides gels having the advantage of solid-like immobility, similar to grease, during storage and transportation, but imparts to the compositions the ability to shear thin to apparent viscosities approximating those of the unmodified liquid fuel when pumped or atomized. Therefore, the thixotropic gel fuels of the present invention can be transported, delivered and used with the conventional equipment and methods used with liquid fuels, such as fuel oil.

Numerous attempts have been made in the past to provide a stable suspension of slurry of a solid combustible material in a liquid combustible material, but without much success. Problems of stability, transportation, storage, handling and use have yet to be overcome. The present invention overcomes these problems and is distinguishable from and patentable over prior art compositions, including those disclosed in the following patents, which are believed to be the most relevant prior art known to applicant.

U.S. Pat. No. 2,938,779 of Kolfenbach et al. discloses a jet fuel having three components: a liquid hydrocarbon fuel; particles of a combustible solid selected from the class consisting of aluminum, magnesium and carbon; and a carbon black of high structure index. It is disclosed that the jet fuel compositions generally possess a semi-fluid or gel-like structure in which the particles of combustible solid are uniformly suspended throughout the liquid hydrocarbon component by the structure black. It is stated that the fuels are characterized by a marked structural stability and uniformity over a wide range of temperatures and they possess flow characteristics that permit them to be transported by means of pumps, lines, etc. There is no mention in the patent, however, that the gels are thixotropic, nor is there any disclosure of the method of making them.

Moreover, there is no indication or suggestion in the patent that the jet fuel compositions may be used with standard type oil burners. Thus, a composition which is a suitable jet fuel may not be suitable for use in heating and for other commercial and industrial purposes. In addition, the carbon blacks disclosed in the patent may not be equivalent to the carbon blacks used in the compositions of the present invention. Thus, the difference in structure between carbon blacks may result in different properties for the compositions containing the carbon blacks.

U.S. Pat. No. 3,414,443 of Pheasant et al. discloses incendiary compositions useful in distress signals and for distress fires. The compositions comprise from 30 to 75 volume percent of finely divided solid fuels having a heat of combustion greater that 9.0 Kcal./ml. uniformly disposed in a gelled meltable solid fuel. The solid fuels comprise finely divided metal powders, such as boron, aluminum, zirconium, magnesium, lithium and metal hydrides. The meltable solid fuels include paraffin wax or lithium metal which are gelled while in the liquid state. Some of the gelling agents disclosed in this patent may be used to gel the composition according to the present invention.

It is clear that the incendiary compositions disclosed in this patent are not suitable for burning in oil burners. Problems relating to transportation, storage, delivery and use would result from the presence of the meltable solid fuels in the compositions. This patent does not disclose the method of making the gel composition.

U.S. Pat. No. 3,620,698 of Schlinger et al. discloses a partial oxidation process for the production of synthesis gas from a thixotropic slurry. The slurry comprises about 10 to 75 weight percent of particulate solid carboniferous fuels in water or in a hydrocarbon liquid fuel containing about 2 to 10 weight percent of soot produced, for example, by partial oxidation of crude oil. The partial oxidation of the slurries are accomplished using an annulus type burner wherein an oxidizing gas or a mixture of oxidizing gas and steam hits a relatively low velocity stream of the slurry, atomizing it and gasifying the atomized particles to form synthesis gas.

Example 1 of the patent discloses that the solid particles are mixed with the liquid fuel before the soot is added and Example 2 illustrates the mixing of all three components apparently simultaneously. There is no teaching or suggestion that a combustion enhancing material is absorbed in porous solid fuel.

The main purpose of the present invention is to produce heat developed when the compositions according to the present invention are substantially completely oxidized during burning in a standard type oil burner. The combustion products formed in the present invention include carbon dioxide and water vapor, rather than carbon monoxide and hydrogen. It appears that the compositions disclosed in the patent are gasified, whereas the compositions according to the present invention are burned.

U.S. Pat. No. 1,390,232 of Bates discloses a process for forming a liquid coal-oil slurry wherein the coal is pulverized in oil to promote fuel stability. Stability is further enhanced by addition of peptizing agents, such as coal derivatives or distillates or by the addition of protective colloids or soaps, such as lime-rosin soap. The coal particles tend to separate from the patented mixture (p. 2, lines 103–107). This patent defines "stable" as meaning "non-separation of the components to a reasonable extent and for a reasonable time sufficient to enable the use of the fuel by atomizing it as fuel oil is now used" (p. 2, lines 121–126). Thus, it is clear that the "stability" of the patented composition is not comparable to the stability of the present compositions wherein the solid particles are not suspended only to a reasonable extent and only for a reasonable time, but rather, are suspendable for many months, and even years. The stabilizing agents of this patent do not appear to form a thixotropic gel of the coal-oil slurry.

U.S. Pat. No. 1,647,471 of Plauson discloses a non-settling liquid suspension or emulsion of a solid combustible carbonaceous material in a liquid fuel. Optional emulsifying agents which accelerate emulsification include soap solutions, rubber solutions, or other colloidal material. In order to form the disclosed emulsion, it is essential to use a cross hammer mill to work the mixture for 1 to 2 hours. There is no recognition or suggestion that the emulsification or suspension is thixotropic or that combustion enhancing material is absorbed in porous carbonaceous material.

U.S. Pat. No. 2,668,757 of Hansley discloses dispersions of amorphous forms of elemental carbon in inert organic liquids. The dispersions are stabilized against settling by the incorporation of ingredients which form a soap in situ. It is stated that the soap may be prepared before, during or after the finely divided particles of carbon are added to the mixture. Thus, it is clear that it is not important for the purposes of this patent that any combustion enhancing materials be absorbed in the carbon particles.

U.S. Pat. No. 3,095,334 of Scurlock discloses a thixotropic gel fuel comprising a finely divided insoluble solid oxidizer in a non-volatile, substantially shock insensitive liquid fuel containing thixotropic gelling agents compatible with the non-volatile liquid fuel. Finely divided, solid metal powders may be added to the composition to increase density and improve specific impulse, which is particularly important when the fuel is a monopropellant. The solid combustible materials used in the composition of the present invention are not metal powders or oxidizers, but rather are carboniferous materials. The present composition is intended for use in standard oil burners which are adapted to use fuel without oxidizers within the fuel composition itself.

U.S. Pat. No. 3,210,168 of Morway discloses a stabilized slurry of pulverized coal coated with a liquid hydrocarbon fuel in water to make the slurry suitable for pumping through a pipeline. An imidazoline stabilizing agent stabilizes the slurry. Although the pulverized coal is coated with a liquid hydrocarbon fuel, there is no teaching or suggestion in the patent that the liquid hydrocarbon fuel is absorbed in the pores of the pulverized coal. In addition, there is no disclosure or suggestion that the patented slurries are combustible in standard type oil burners or that they are thixotropic.

U.S. Pat. No. 3,359,040 of Every et al. discloses a method of transporting particulate solid particles in a carrier liquid by pipeline. The solid particulate material, such as coal, is mixed with water which is adsorbed on the surface of the solid. The solid with the adsorbed water is then mixed with a hydrocarbon carrier liquid to form a slurry which may be stored without objectionable compaction. The slurry can be pumped through a pipeline without objectionable compaction within the pipeline. However, the solid particles settle when the slurry is allowed to stand.

It is clear from the patent that it is not related to a method of producing a thixotropic gel fuel wherein combustion enhancing materials are absorbed in porous, solid combustible material. The disclosure that water is adsorbed on the surface of coal particles and then mixed with a hydrocarbon carrier liquid does not teach or suggest the method of the present invention nor the compositions produced in accordance with the method. Thus, there is no indication that the patented slurry is thixotropic or that it is capable of being burned in a standard type oil burner. Nor is there any indication that the slurry is comprised of any of the gelling agents or ash modifiers set forth in the present application.

U.S. Pat. No. 3,449,178 of Tarpley, Jr. discloses thixotropic liquid oxidizer propellant mixtures comprising a mixture of a particular carbon black added to liquid oxidizer propellants. The gel has a yield stress of about 40 to 1500 dynes per square centimeter and may contain surfactants or solid materials which are non-reactive at storage temperatures. The mixtures are formed by shear working or ultrasonic dispersion. The patented compositions are not well suited for burning in standard type oil burners.

Other relevant patents which relate to coal in oil slurries, but which are not considered to be as relevant as the patents discussed above due to the different types of characteristics and stabilizing components, and different methods of making them, include: U.S. Pat. No. 2,397,859 of Hersberger et al., U.S. Pat. No. 2,754,267 of Biondi, U.S. Pat. No. 3,539,406, 3,613,372 and 3,617,095, all of Lissant, U.S. Pat. No. 3,732,084 of Nixon et al. and U.S. Pat. No. 4,030,894 of Marlin et al.

SUMMARY OF THE INVENTION

The present invention comprises a method of making thixotropic gel fuel compositions comprising the steps of absorbing a combustion enhancing material in the pores of porous solid carboniferous particles, and mixing the solid carboniferous particles containing the combustion enhancing material with a liquid fuel and an effective amount of a gelling agent, wherein the solid carboniferous particles containing the combustion enhancing material form about 5 to about 75 volume percent of the composition; and the compositions made according to the method.

Ash modifiers may be incorporated in the thixotropic gel fuel compositions to minimize ash fouling of the burning apparatus. Some of the ash modifiers raise the melting point of the ash so that it is exhausted with the flue gases. Another type of ash modifier reduces the melting point of the ash so that the compositions can be used in wet bottom furnaces wherein the ash forms a type of slag which flows to the bottom of the furnace.

DESCRIPTION OF THE PREFERRED EMBODIMENTS

The main components of the compositions according to the present invention are a solid carboniferous combustible material, a combustion enhancing material, a liquid fuel and a substantially completely combustible gelling agent in one embodiment of the invention. Another embodiment of the invention includes the same components with the addition of an effective amount of an ash modifier to modify the melting point of any ash produced by the burning of the composition to prevent the ash from fouling the furnace or other burning apparatus. Some types of gelling agents have the ability to act as ash modifiers also.

The solid carboniferous combustible material which is incorporated in the thixotropic gel fuel may be any combustible material containing carbon which is insoluble in the liquid and capable of being suspended in the thixotropic gel. Suitable carboniferous materials include coal, coke, pitch, charcoal, tar sand, oil shale, wood fibers, waste paper, waste carbon paper, bagasse, waste agricultural products, char, etc. The solid combustible material may naturally contain absorbed combustion enhancers, such as water in waste agricultural products.

It is preferred for combustion efficiency that the solid carboniferous combustible material be finely divided, but it is not necessary that the particles be of colloidal size. In fact, in suitable furnaces, granules can be used. A suitable particle size would be wherein about 80 weight percent pass through a 200 mesh screen and are retained on a 325 mesh screen, although smaller particles could be used.

The solid carboniferous combustible material used in the present invention has a certain degree of porosity. For example, the West Virginia Geological Survey, Volume 13, Characteristics of Mineable Coals of West Virginia (1955), reports that the coal of that region generally has a porosity of about 1 to about 7 percent and that coal having a 17 percent porosity has been mined. The porous nature of the solid carboniferous combustible material is used to the advantage of the present invention. It has been discovered that the combustion of the solid combustible materials and hence, the combustion of the entire composition, can be improved and made more efficient by absorbing combustion enhancing materials in the porous solid combustible materials.

Suitable combustion enhancing materials include volatile combustible materials, such as alcohols, low boiling petroleum fractions, for example light naphthas, pentane, butane and the like. These types of materials and other combustible liquids which have a lower ignition point than the solid carboniferous combustible material can pilot ignition of the solid material as it is exposed during atomization in the furnace or other burning apparatus. In addition, these substances, as well as water, can be advantageous in the early phases of ignition of the solid particles in the furnace, since they expand rapidly on being exposed to heat and cause secondary atomization or micro-explosions of the suspending thixotropically gelled liquid or even the solid. Moreover, oxygenated material, such as the alcohols and water, can participate in the early phases of the combustion reaction and tend to promote clean combustion requiring less air in the combustion chamber.

It is important in the method according to the present invention that the combustion enhancing material be absorbed in the porous solid carboniferous combustible material before the other components of the composition are mixed with the solid carboniferous combustible material. Otherwise, excessive quantities of gelling agent, ash modifier or impurities which will not enhance the combustion process, and which may hinder the combustion of the composition may be absorbed in the solid combustible material. Additionally, the absorption of the combustion enhancing material in the porous solid combustible material generally makes it easier to mix the components forming the composition prior to gelation.

The combustion enhancing material may be absorbed in the porous solid combustible material by soaking the solid combustible material in the combustion enhancing material for several hours at ambient pressure or under at least a partial vacuum for more rapid absorption. Preferably, the soaking mixture is agitated to completely expose the porous particles to the combustion enhancing material. The vacuum and agitation aid in substituting the desired combustion enhancing materials for any inert substances, impurities or any other materials in the pores of the solid combustible material which may hinder combustion of the composition.

Another embodiment which may be used to absorb the combustion enhancing materials in the porous solid combustible material is ultrasonic impregnation in which a mixture of the combustion enhancing material and the solid combustible material are subjected to ultrasonic cavitation. Suitable apparatus and a method of using it is set forth in U.S. Patent application Ser. No. 839,231, filed Oct. 4, 1977, entitled "Ultrasonic Wet Grinder" of William B. Tarpley, Jr., the disclosure of which is hereby incorporated herein by reference.

The combustion enhancing material is considered to be absorbed in the pores of the solid combustible material when a given quantity of solid combustible material from which excess liquid has been drained no longer exhibits an increase in weight. Following absorption, the solid carboniferous material containing the combustion enhancing material is mixed with a liquid fuel and a gelling agent and optional ingredients, such as ash modifiers, catalysts, oxidizers, etc., to form a thixotropic gel fuel composition capable of being used in standard types of oil burners. The solid carboniferous particles containing the combustion enhancing material should form about 5 to about 75 volume percent of the thixotropic gel fuel composition.

The liquid fuel in which the solid carboniferous combustible material is suspended need only be combustible and gelable. Preferably, the liquid fuel has a lower ignition point than the solid material to pilot the ignition of the solid material as the composition is atomized in the furnace. As long as a substance has the characteristics required of both the combustion enhancing material and the liquid fuel, the substance can serve both purposes. Thus, it is not essential that the combustion enhancing material be different that the liquid fuel.

Suitable liquid fuels include fuel oils; alcohols; waste organic solvents, such as benzene, acetone, chlorinated solvents which are generally decomposed by the heat generated by burning the gels, and other combustible, gelable wastes from industrial and chemical operations; gasoline; kerosene; naphtha; and the like. Various mixtures of liquid fuels may also be used.

The gelling agents to be used in this invention may be substantially completely combustible so as to avoid forming significantly more ash when the thixotropic gel compositions burn. As used herein, "substantially completely combustible" means that only about 2 weight percent ash remains after combustion of the gelling agents. The substantially completely combustible gelling agent should be present in an amount of about 1 to about 10 weight percent.

Two types of substantially completely combustible carbon blacks are useful as gelling agents in the compositions of the present invention. One type is formed from acetylene gas by continuous thermal decomposition and comprises colloidal size particles of carbon joined together in a chain-like fashion. Electron micrographs demonstrate that the particles are joined in a chain-like structure or fibrous fashion so that the mass of the carbon black is a persistent three-dimensional structure. This type of carbon black will be referred to herein as "acetylene black," and is available from Shawinigan Chemical Company, a division of Gulf Oil of Canada, Ltd.

Another type of carbon black which can be used in the practice of this invention has a clean micro-surface and a high degree of surface area, the surface being internal with particles smaller than 25 millimicrons as measured by an electron microscope and presenting a ratio of BET surface as determined by nitrogen adsorption measurement to electron microscope surface of between 2½ and 6 and with larger particles being external, namely, possessing persistent reticulate chain formation observable in the electron microscope after mulling by the procedure of Ladd, *Rubber Age*, Volume 67, June 1945, p. 299. This type of carbon black is available from Columbian Chemicals Division, Cities Service Co., Cabot Corporation and Degussa, for example.

Other suitable substantially completely combustible gelling agents include hydroxypropyl cellulose, methyl cellulose, carrageenan and other natural and synthetic gums and resins, chemically modified castor oil of the type available from N.L. Industries, Inc. under the trademark "Thixcin R," butyl rubber, para-tertiary-butyl styrene polymers, amine reacted carboxypolymethylene resins, methyl vinyl ether-maleic anhydride copolymers, polyvinyl sulfonate, the latter two gelling agents being useful for the more polar liquid fuels, and the like.

With respect to the natural and synthetic cellulosic gums, hydration of these gelling agents with a small amount of water followed by cross-linking to form weak bonds permits the formation of gels in non-aqueous systems.

The function of the gelling agent is to keep the solid particles in the composition from contacting each other so that they do not adhere to each other, as by sintering or by Van der Waals attraction.

The thixotropic gel fuel compositions according to the present invention demonstrate reversible pseudoplasticity. That is, under conditions of relatively short relaxation time, the yield stress value possessed by these compositions permit them to retain their gel or gel-like form under little or no external force. However, when subjected to the type of external force encountered in pumping the compositions for delivery to a storage tank or forces caused by the flow through the small orifices typical of injection nozzles in standard type oil burners and other combustion equipment, the compositions will be in liquid form. The compositions of the present invention resume their gel or gel-like structure almost immediately after being subjected to flow forces.

Yield stress represents the force necessary to cause the gel to liquefy and start to flow. The yield stress at which the thixotropic gel fuels become fluid can be readily adjusted by varying the amount of components of the compositions. It is necessary that this yield stress be sufficiently high that the gravitational force on a suspended particle will not cause that particle to liquefy the gel beneath it so that the particle will settle. On the other hand, to move the thixotropic gel fuel compositions conveniently, to pump them with standard equipment and to drain storage and transportation tanks as completely as possible, it is desirable that the yield stress be kept as low as possible. The yield stress should be adjusted so that the self-supporting height of the gel will be very low, on the order of a few inches at most, whereby the tanks can be drained substantially commpletely of their contents without requiring special mechanical cleaners or drainers. Suitable yield stress values are about 20 to about 300 dynes per square centimeter.

Another embodiment of the present invention includes an effective amount of an ash modifier in the thixotropic gel fuel compositions discussed above. The ash modifier is stably suspended throughout the thixotropic gel. The ash modifier modifies the melting point of the ash produced by the burning of the composition to minimize or prevent the ash from fouling the furnace or other burning apparatus.

The ash modifiers should be added in an amount equivalent in weight to the ash content of the solid carboniferous combustible material and the liquid fuel present in the composition. For example, if the net ash content of coal and fuel oil in a composition according to the present invention amount to, say, 5–10%, then 5-10% of the ash modifying additives should be incorporated in the composition. Preferably, the ash modifiers have a particle size of less than 100 mesh.

One type of ash modifier acts to increase the melting point of the fused ash in the combustion zone to prevent its persistent deposition as a viscous liquid or solid on the walls of the furnace and on the heat exchange surfaces. The modified ash will be in the form of dry dust which is exhausted along with the flue gases generated in the furnace. Conventional scrubbers and like equipment may be used to remove the ash from the flue gases. Suitable additives which raise the melting point of the composition include silica, alumina, titania, zirconia, magnesium oxide, calcium oxide, or chemical compounds which will give these oxides on combustion, dolomite, kaolin and attapulgite clays.

The present compositions may be burned in wet-bottom furnaces wherein the ash is drained out as a liquid. When using the wet-bottom furnaces, it may be desirable to add ash modifiers which lower the viscosity and melting point of the ash so that it will drip down into the bottom portion of the furnace from which it will be removed, rather than forming persistent deposits on the walls and heat exchange surfaces of the furnace. Clays having an appreciable sodium or potassium content are useful in lowering the melting point of the ash to prevent it from fouling the furnace. Examples of suitable compounds include bentonites from Wyoming and Algeria and hectorite which have been found to have a relatively high sodium or potassium content.

Several kinds of substances may act both as a gelling agent capable of forming a thixotropic gel and an ash modifier capable of modifying the melting point of ash generated by burning the present compositions in a furnace to minimize or prevent the ash from fouling the furnace. These gelling agents-ash modifiers are described in the U.S. patent application Ser. No. 857,327 of William B. Tarpley, Jr. entitled "Thixotropic Gel Fuel With Ash Modifier," filed simultaneously with the present application, the disclosure of which is hereby incorporated herein by reference. Briefly, these gelling agents-ash modifiers include metallo organic compounds, finely divided inorganic compounds and clays of the type discussed in the last-mentioned application. These gelling agents-ash modifiers may be used in the method and compositions of the present invention.

The thixotropic gel fuel compositions according to the present invention are made by vigorously agitating a mixture of the carboniferous particles containing the absorbed combustion enhancing material, the liquid fuel, the gelling agent and any optional ingredients which do not adversely affect the composition. This can be accomplished in many cases by shear working using conventional equipment, however, ultrasonic dispersion may be employed advantageously, especially where it is desirable to shorten the preparation time and improve the wetting of the carrier liquid and the particulate solids.

After the combustion enhancing material is absorbed in the porous carboniferous material, the order of addition of the components is generally not critical so long as an intimate mixture is obtained. Sometimes it is easier to form the thixotropic gels by mixing the gelling agent with a small amount of the liquid fuel before adding the remainder of the liquid and the other components.

The present invention will now be described with reference to the following specific, non-limiting examples:

EXAMPLE 1

Coke with a particle size of 80% less than 200 mesh and a 15% porosity is saturated with ethyl alcohol and allowed to soak overnight with intermittent stirring. The coke with the absorbed ethyl alcohol is mixed with a thixotropic gel comprising No. 6 fuel oil and BENTONE 38, prepared by high shear mixing of the gellant with the fuel oil. The resulting composition comprises 25% coke, 2.7% ethyl alcohol, 69% No. 6 Fuel oil and 2.3% BENTONE 38. The composition burns well because of the flash vaporization of the ethyl alcohol upon injection into the furnace. The composition is thixotropic having a yield stress of about 20 dynes per square centimeter.

EXAMPLE 2

Coal, powdered to a particle size of approximately 80% less than 200 mesh and containing about 7% porosity, is saturated with methanol by soaking, while drawing a partial vacuum until bubbling ceases. The vacuum is then released. This is repeated at periodic intervals until bubbling is no longer apparent. The coal is then drained and the coal with the absorbed methanol is mixed with a thixotropic gel formed by high shear mixing of No. 2 fuel oil with pyrogenic silica. The resulting composition comprises 45% coal, 2.2% methanol, 51.8% fuel oil, and 1% pyrogenic silica by weight.

EXAMPLE 3

Coal of about 7% porosity is mixed with water and passed through an ultrasonic wet grinder of the type described in the copending patent application Ser. No. 839,231. In the process, it is reduced in size to where approximately 80% would pass through a 200 mesh screen, and water content absorbed into the coal pores amounted to about 5%. The coal with the absorbed water is suspended in a thixotropic gel comprising 40% coal with water, and 58% by weight of No. 2 fuel oil with 2% by weight of THIXCIN R. The composition is stable, has a yield stress of about 20 dynes per square centimeter, and on injection into the furnace shows the characteristic properties of water-coal-oil emulsions, namely improved combustion with little excess air required for combustion and lowered emission of oxides of nitrogen.

EXAMPLE 4

Coal containing 5% porosity is dried at elevated temperatures until free of water and put into a closed vessel. A vacuum is drawn on the vessel until the coal is de-aired. Pentane is then distilled into contact with the coal, allowing the vapors to penetrate into the pores and condense. While still chilled, this coal is drained and dispersed into a thixotropic gel having a final composition of 40 weight percent coal with pentane, comprising 58 weight percent of No. 2 fuel oil and 2 weight percent of THIXCIN R prepared by high shear mixing. The resulting composition is stable, does not settle, and the diffusion of the pentane is appreciably reduced by virtue of being in contact with the gelled fuel oil. Accordingly, when the composition is injected into a burner, there is flash vaporization of the pentane and improved atomization.

In addition, other examples of compositions which may be made in accordance with the method of the present invention are disclosed in the U.S. patent application Ser. No. 857,325 of William B. Tarpley, Jr. entitled "Thixotropic Gel Fuels," filed simultaneously with the present application, the disclosure of which is hereby incorporated herein by reference, and the U.S. patent application of William B. Tarpley, Jr. entitled "Thixotropic Gel Fuel With Ash Modifier" which was referred to hereinbefore.

The present invention may be embodied in other specific forms without departing from the spirit or essential attributes thereof and, accordingly, reference should be made to the appended claims, rather than to the foregoing specification as indicating the scope of the invention.

I claim:

1. A method of making a thixotropic gel fuel composition comprising the steps of:
   (a) first absorbing a combustion enhancing material in the pores of porous solid carboniferous particles; and
   (b) then mixing the solid carboniferous particles containing the combustion enhancing material with a liquid fuel and an effective amount of a gelling agent to form a stable thixotropic gel composition having a solid-like immobility at rest wherein the solid carboniferous particles containing the combustion enhancing material from about 5 to about 75 volume percent of the composition.

2. A method according to claim 1 wherein the absorbing step (a) comprises soaking the solid carboniferous particles in the combustion enhancing material under at least a partial vacuum.

3. A method according to claim 1 wherein the absorbing step (a) comprises subjecting a mixture of the combustion enhancing material and the solid carboniferous particles to ultrasonic cavitation.

4. A method according to claim 1 wherein the mixing step (b) is accomplished by shear working a mixture of the solid carboniferous particles containing the combustion enhancing material, the liquid fuel and the gelling agent.

5. A method according to claim 1 wherein the mixing step (b) is accomplished by ultrasonically agitating a mixture of the solid carboniferous particles containing the combustion enhancing material, the liquid fuel and the gelling agent.

6. A method according to claim 1 wherein the solid carboniferous particles are coal particles having a size of about 325 mesh to about 80 weight percent minus 200 mesh.

7. A method according to claim 1 wherein the combustion enhancing material has a lower ignition point than the solid carboniferous particles.

8. A method according to claim 7 wherein the combustion enhancing material is selected from the group consisting of low boiling petroleum fractions, alcohols and mixtures thereof.

9. A method according to claim 1 wherein the combustion enhancing material is a material which rapidly expands when exposed to heat to cause secondary atomization selected from the group consisting of low boiling petroleum fractions, alcohols, water and miscible mixtures thereof.

10. A method according to claim 1 wherein the liquid fuel is selected from the group consisting of fuel oils, alcohols and waste organic solvents.

11. A method according to claim 1 wherein the composition has a yield stress of about 20 to about 300 dynes per square centimeter.

12. A method according to claim 1 further comprising adding an effective amount of an ash modifier into the mixture in step (b) to modify the melting point of ash produced by the burning of the composition to minimize ash fouling of the burning apparatus.

13. A method according to claim 1 wherein the gelling agent is also an ash modifier capable of modifying the melting point of ash produced by the burning of the composition to minimize ash fouling of the burning apparatus.

14. A composition made according to the method of claim 1.

15. A composition made according to the method of claim 2.

16. A composition made according to the method of claim 3.

17. A composition made according to the method of claim 4.

18. A composition made according to the method of claim 5.

19. A composition made according to the method of claim 6.

20. A composition made according to the method of claim 7.

21. A composition made according to the method of claim 8.

22. A composition made according to the method of claim 9.

23. A composition made according to the method of claim 10.

24. A composition made according to the method of claim 11.

25. A composition made according to the method of claim 12.

26. A composition made according to the method of claim 13.

* * * * *